Aug. 14, 1934.　　　　G. W. RYDNER　　　　1,970,252
VEHICLE SIGNAL
Filed March 3, 1927
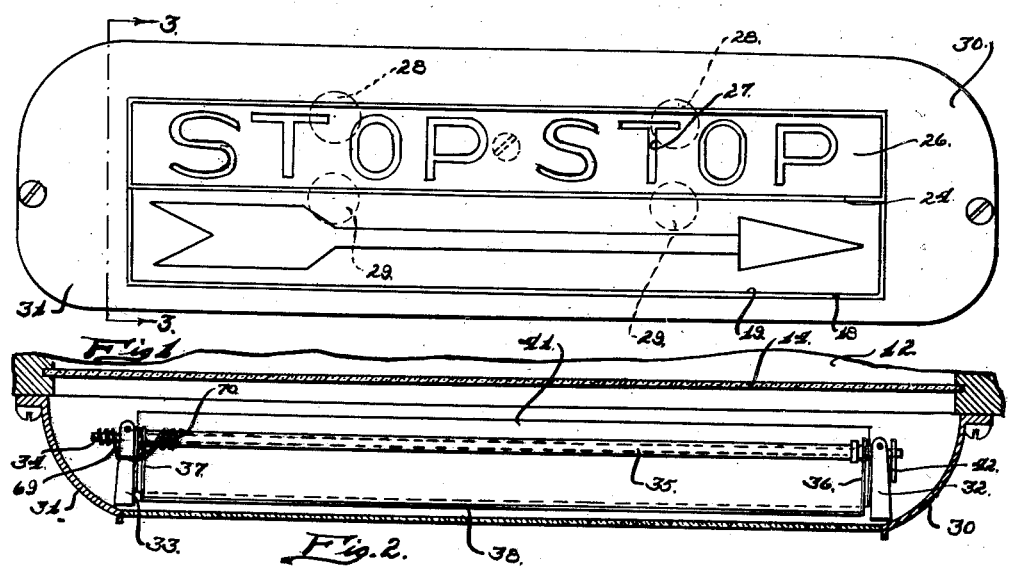
INVENTOR.
Gustaf. W. Rydner.
BY
ATTORNEY.

Patented Aug. 14, 1934

1,970,252

UNITED STATES PATENT OFFICE 1,970,252

VEHICLE SIGNAL

Gustaf W. Rydner, Detroit, Mich.

Application March 3, 1927, Serial No. 172,268

2 Claims. (Cl. 177—339)

My invention relates to a new and useful improvement in a vehicle signal adapted for use with vehicles of various types, particularly, automobiles, etc., whereby the operator of the vehicle may signal to those not riding in the vehicle, particularly the drivers of approaching and following vehicles, his intention in operating the vehicle; for instance, whether he is intending to stop, make a right hand turn or left hand turn, etc.

It is an object of the present invention to provide a vehicle signal of this class so mounted on the vehicle that the operator may know at all times whether or not the signal is functioning.

It is another object of the invention to provide a vehicle signal of this class so mounted on the vehicle both in the front and the rear that the operator may at a glance determine whether or not both of the signals are functioning, and if not, which one is inoperative.

Another object of the invention is the provision of a vehicle signal of this class which will be simple in structure, economical of manufacture and highly efficient in use.

Another object of the invention is the provision of a pair of rockably mounted display members so arranged that they may be rocked to be displayed at desired times and as selected.

Another object of the invention is the provision of a cam actuated mechanism for rocking these display signals selectively and at the same time, illuminating the signal to cause its display.

Other objects will appear hereinafter.

The invention consists in the combination and arrangement of parts hereinafter described and claimed.

The invention will be best understood by a reference to the accompanying drawing which forms a part of this specification, and in which, Fig. 1 is a front elevational view of the display operation of the invention.

Fig. 2 is a sectional view taken on line 2—2 of Fig. 3.

Fig. 3 is a fragmentary sectional view taken on line 3—3 of Fig. 1, showing the invention attached to a vehicle.

Fig. 4 is a longitudinal vertical sectional view of a vehicle shown in fragment with the invention applied.

Fig. 5 is a cross section of the front housing, similar to Fig. 3.

Fig. 6 is a sectional view taken on line 6—6 of Fig. 7.

Fig. 7 is a sectional view taken on line 7—7 of Fig. 6.

Fig. 8 is a diagrammatic view illustrating the wiring of the invention.

The invention is illustrated as mounted on a body 11 of a vehicle with which used, and comprises a pair of housings located at the rear of the vehicle and the forward part thereof respectively adjacent the upper end of the body 11. The housings at both the rear and the front of the vehicle are of similar structure and are equipped with similar mechanism excepting the stop housing is omitted in front, so that a description of one will suffice as a description of both.

Vehicles, as now used, are generally provided in the rear wall 12 with a window opening 13 closed with a window pane 14. Projecting from the rear of the vehicle is a rubber gasket 15 engaging with which is the inner edge of the lower wall 16 of the housing, a suitable T shaped strap of material 17 being connected to this edge of the lower wall 16 to serve to bind the lower wall on the gasket 15. Adjacent the outer edge of the lower wall 16 is an upwardly projecting flange 18 engaging the inner surface of a closure 19 which is preferably formed transparent. In the embodiment shown in the drawing, I have provided the housing with a separate compartment 20 which may be used to indicate the intentions of the driver to bring the vehicle to a stop. However, the other section of the housing is used for indicating the intentions as to direction of turn and may be used separately, if desired. This compartment 20 is formed by a housing 21 which is mounted on the rear wall 12. Projecting downwardly from the lower wall 22 of the housing 21 is a flange 23 which also engages the inner surface of the transparent closure 19. Engaging the upper edge of the transparent closure 19 is a flange 24 and a shoulder 25 is utilized to engage the inner surface of the transparent closure 26. This transparent closure is provided with display means 27 and the compartment may be illuminated by the light bulbs 28. The lowermost section of the housing is also illuminated by the light bulbs 29. Projecting inwardly from the end walls 30 and 31 of the lowermost section are brackets 32 and 33 respectively, in which is journalled a shaft 34. Mounted loosely on the shaft 34 is a sleeve 35, fixedly connected to opposite ends of which are legs 36 and 37 of a U shaped member the bight 38 thereof being formed curved to provide a display member upon which display mechanism may be mounted, as a word, an arrow, or other indicating means to indicate the direction of turn intended to be made by the driver of the vehicle. Fixedly attached to this sleeve is a link 39 which is attached to the cable 40. Fixedly mounted upon the shaft 34 and embracing the U shaped member having the legs 36 and 37 and the bight 38 is an outer U shaped member 41 having at its outer surface or periphery display media in the form of words, or other indicating devices.

Projecting outwardly from the shaft 34 and fixedly mounted thereon is a link 42 connected to the cable 43. These cables extend outwardly through an opening 44 formed in the rear wall 12 and through a suitable cable 45 to the forward part of the vehicle where the operating mechanism is mounted.

This operating mechanism comprises a housing 46 which is mounted at the forward part of the vehicle in a position easily accessible to the driver thereof, and preferably on the dash. Communicating with the interior of the housing is a guide neck 47, through which the cable 45 is projected. In the case of mounting a housing at both the front and the rear the cables connecting to the forward housing would also pass through the neck 47. Rockably mounted at one end in the housing 46 is a lever 48 connected at one end to one end of the cable 40. A similar lever 49 is rockably mounted at one end of the housing 46 and connected at its free end to the cable 43. Projecting outwardly from the forward wall 50 of the housing 46 is a neck 51 which serves as a bearing for the hub 52 of a pinion 53. The hub 52 is fixedly connected to a shaft 54 which extends outwardly from the face 50 of the housing and is journalled in bearings 55 and 56 mounted in the sleeve 57, this sleeve being retained in position by means of the collar 58 which is threaded on the neck 51. The pinion 53 engages the teeth of the segment 59, projecting outwardly from which is a contact arm 60. Mounted on the rear wall of the housing 46 is an insulating block 61 carrying a contact 62 adapted to engage a spring contact 63 carried by the contact arm 60. Projecting from the hub 52 and rotatable therewith is a cam shaft 64 mounted upon which is a cam 65 adapted upon rotation of the shaft 54 to engage the lever 49 so as to cause a rocking of this lever. As this lever rocks the cable 43 will be drawn so as to move the display member 41 into operative or displaying position. Mounted on the shaft 64 is a cam 66 adapted to engage the lever 48 upon a rotation of the shaft 54 by means of the handle 67, so as to rock this lever 48 sufficiently to draw the cord 40 so as to swing the other display member into registering position with the opening in the housing. At the same time that these display members are swung into operative position so as to register with the opening formed in the housing the contact 62 or the contact 68 will be brought into engagement with the contact 63 so as to close a circuit to the light bulbs 29.

It is evident that by turning the shaft 54 in either direction, the display members may be selectively raised to operative position. When the handle is returned to normal position, the contacts are disengaged and the circuit to the illuminating means broken, these display members returning to downwardly moved inoperative position in response to gravity and also in response to the pressure of the springs 69 and 70.

As shown in the diagrammatic view, a contact 71 is connected by the wire 83 through the brake operated switch 84 to the light bulbs 28. A manually operated switch 72 is interposed in the wire 85 to afford a means of manually controlling the operation of the light bulbs 28. In normal position, the contact arm 60 will engage the contact 71 and normally the switch 72 will be open. Likewise the switch 84 will be open until the brakes are applied so that the light bulb 28 which functions as a "stop light" may be controlled through the brake switch 84 or the manually operated switch 72, the manually operated switch serving as a means for lighting the bulbs when the contact arm 60 is out of engagement with the contact 71.

In this manner I have provided a simple and inexpensive device which may be easily and quickly operated after the device is mounted on the vehicle. Most of the vehicles as now used have a mirror 73 mounted at the forward part of the vehicle so that the operator, by glancing in the mirror, can observe the road behind through the window pane 14. When the housing at the rear is mounted in the position shown in Fig. 4, the operativeness of the bulbs 29 may be determined by observing the light through the window pane 14, so that the operator, by glancing in the mirror 73, can ascertain whether or not the bulbs 29 are functioning. On account of having the housing at the forward part of the vehicle mounted adjacent the top thereof, close to the mirror with an opening in the body communicating with the front housing, the operator, by glancing in the mirror, can at the same time see through the rear wall of the front housing to determine whether or not the light is functioning, so that both the housings may be observed at a glance by the operator without disturbing the normal operation of the vehicle.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. The combination with an automobile having the conventional rear window, windshield, and rear vision mirror adjacent the top of said windshield; a front signal casing mounted in advance of said mirror, a rear signal casing mounted adjacent the top of said window; said rear casing having a rearwardly presented signal opening visible at the rear of the machine and a forwardly presented tell-tale opening visible in said mirror; said front casing having a forwardly presented signal opening and a tell-tale opening, the latter being in driver's field of vision while glancing at the reflection of the tell-tale opening of the rear casing in said mirror; and means for simultaneously displaying a signal in said signal openings and a tell-tale indicator visible through said tell-tale openings.

2. The combination with an automobile having the conventional windshield and rear vision mirror adjacent the top of said windshield, a front signal casing mounted in advance of said windshield above the driver's line of vision, said casing having a front signal opening and a tell-tale opening, both pervious to light, said signalling opening being forwardly presented and visible from points in advance of the machine, said tell-tale opening being visible to the driver of the machine when looking into said rear vision mirror and means for simultaneously displaying a signal in said signalling opening and a tell-tale indication visible through said tell-tale opening.

GUSTAF W. RYDNER.